US012344512B2

(12) United States Patent
Owston

(10) Patent No.: US 12,344,512 B2
(45) Date of Patent: Jul. 1, 2025

(54) WORKING MACHINE

(71) Applicant: J. C. Bamford Excavators Limited, Uttoxeter (GB)

(72) Inventor: Charles Edward Owston, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 220 days.

(21) Appl. No.: 18/155,733

(22) Filed: Jan. 17, 2023

(65) Prior Publication Data

US 2023/0286791 A1 Sep. 14, 2023

(30) Foreign Application Priority Data

Jan. 17, 2022 (GB) ..................................... 2200511

(51) Int. Cl.

*B66F 17/00* (2006.01)
*B66F 9/075* (2006.01)
*B66F 9/20* (2006.01)
*E02F 9/24* (2006.01)

(52) U.S. Cl.

CPC ........ *B66F 17/003* (2013.01); *B66F 9/07509* (2013.01); *B66F 9/07572* (2013.01); *B66F 9/20* (2013.01); *E02F 9/24* (2013.01)

(58) Field of Classification Search

CPC .......................... B66F 17/003; B66F 9/07509; B66F 9/07572; B66F 9/20; E02F 9/24

See application file for complete search history.

(56) References Cited

U.S. PATENT DOCUMENTS 7,963,528 B2 * 6/2011 North ........................ B60G 9/02 280/5.515
9,828,049 B2 * 11/2017 Lyle .......................... E02F 9/08
11,549,241 B2 * 1/2023 Hogan ...................... E02F 3/26
2002/0075157 A1 6/2002 Muller
2004/0031628 A1 2/2004 Schiebel et al.
2004/0180753 A1 * 9/2004 Takamura ............. B60W 10/18 477/94
2006/0232025 A1 10/2006 Braud (Continued)

FOREIGN PATENT DOCUMENTS

EP 1 953 022 A1 8/2008
EP 2218832 A2 8/2010

(Continued)

OTHER PUBLICATIONS

Search Report issued in GB 2200511.0, dated Jun. 30, 2022.
Extended European Search Report issued in EP 23151361.5, dated May 25, 2023.

*Primary Examiner* — Gertrude Arthur Jeanglaude
(74) *Attorney, Agent, or Firm* — MARSHALL, GERSTEIN & BORUN LLP

(57) ABSTRACT

A working machine has a body, a ground-engaging propulsion structure supporting the body, an inclinable working arm pivotally connected to the body mounting a working implement at a distal end thereof, a drive arrangement configured to provide motive power, and a control system configured to determine a center of gravity of the working machine. The control system is configured to control or restrict a speed of movement of the working machine in response to the determined center of gravity.

20 Claims, 2 Drawing Sheets

(56) References Cited

U.S. PATENT DOCUMENTS

| | | | |
|---|---|---|---|
| 2013/0211679 | A1 | 8/2013 | Gerdes et al. |
| 2014/0015685 | A1 | 1/2014 | Wei et al. |

FOREIGN PATENT DOCUMENTS

| | | | |
|---|---|---|---|
| EP | 2233427 | A1 | 9/2010 |
| EP | 2 578 756 | A1 | 4/2013 |
| EP | 2 886 724 | A2 | 6/2015 |
| EP | 3280676 | A1 | 2/2018 |
| GB | 2560328 | A | 9/2018 |
| WO | WO-2014/188162 | A2 | 11/2014 |

* cited by examiner

WORKING MACHINE

FIELD

The present teachings relate to a working machine.

BACKGROUND

Off-highway vehicles or working machines are for example those used in construction industries configured to transport loads over a surface (e.g. backhoe loaders, slew excavators, telescopic handlers, forklifts, skid-steer loaders etc.). These working machines typically have a body supported by a ground-engaging propulsion structure such as front and rear wheels, or a pair of endless tracks. To propel the working machine, a drive arrangement, including for example a transmission and a prime mover such as an internal combustion engine or electric motor, provides motive power to the ground-engaging propulsion structure. Working machines typically have a working arm pivotally mounted to the body of the machine, and a working implement, such as a bucket, forks or a grabber, attached to the end of the arm via a coupling device. Attachment of the working implement enables the working machine to perform a variety of tasks on a work site.

For such working machines, when the working arm is moved into a position such that the location of the working machine's center of gravity changes significantly, the working machine may become less stable. In such instances, the working machine may tip over, potentially causing injury to the operator or damage to the working machine.

The present teachings seek to overcome, or at least mitigate the problems of the prior art.

SUMMARY

According to a first aspect there is provided a working machine comprising: a body; a ground-engaging propulsion structure supporting the body; a working arm pivotally connected to the body so as to be inclinable relative to the body, wherein the working arm is configured to mount a working implement at a distal end thereof; a drive arrangement configured to provide motive power to the ground-engaging propulsion structure; and a control system configured to determine a center of gravity of the working machine, wherein the control system is configured to control or restrict a speed of movement of the working machine in response to the determined center of gravity.

The center of gravity and thus the stability of the working machine may change according to the position of the load handling apparatus relative to the body. Moreover, the working machine may become less stable when travelling at high travel speeds and when undergoing large changes in travel speed (i.e. high acceleration and deceleration). As such, by controlling or restricting a speed of movement of the working machine in response to the determined center of gravity, the control system may help to inhibit movements that would lead to instability of the working machine (e.g. longitudinal or lateral tip over of the machine).

The control system may be configured to limit the speed of movement of the working machine to a maximum speed of movement based on the determined center of gravity.

Advantageously, based on the determined center of gravity of the machine, the determined maximum speed may be determined such that instability of the working machine is inhibited when the working machine is moving at or below said determined maximum speed. Thus, by preventing the working machine from moving at a speed higher than a determined maximum speed, instability of the working machine can be inhibited.

The control system may be configured to determine the center of gravity of the working machine based on an angle of inclination of the working arm, and wherein the maximum speed of movement is based on an angle of inclination of the working arm relative to the body.

The center of gravity of the working machine may change as a function of the angle of inclination of the working arm. Thus, basing the maximum speed on the angle of inclination of the working arm may inhibit instability of the working machine.

The control system may be configured such that the maximum speed of movement decreases as the angle of inclination of the working arm increases.

The maximum speed of movement may be inversely proportional to the angle of inclination of the working arm.

Increasing the angle of the working arm may move the center of gravity of the working machine such that the stability of the working machine is reduced. Thus, decreasing the maximum speed as the determined angle of the working arm increases may inhibit instability of the working machine.

The working arm may be a telescopic working arm that is extendable and retractable. The control system may be configured to determine the center of gravity of the working machine based on a length of the working arm, and wherein the maximum speed of movement is based on the length of the working arm.

The center of gravity of the working machine may change as a function of a length of the working arm. Thus, basing the maximum speed on a length of the working arm may inhibit instability of the working machine.

The control system may be configured such that the maximum speed of movement decreases as the length of the working arm increases.

Increasing the length of the working arm may move the center of gravity of the working machine such that the stability of the working machine is reduced. Thus, decreasing the maximum speed as the length of the working arm increases may inhibit instability of the working machine.

The control system may be configured to limit the rate of change of the speed of movement to a maximum rate of change of speed of movement based on the determined center of gravity.

Advantageously, based on the determined center of gravity of the machine, the determined maximum rate of change of speed may be determined such that instability of the working machine is inhibited when the working machine is moving at or below said determined maximum rate of change of speed. Thus, by preventing the working machine from moving at a rate of change of speed higher than a determined maximum rate of change of speed, instability of the working machine can be inhibited.

The control system may be configured to determine the center of gravity of the working machine based on an angle of inclination of the working arm, and wherein the maximum rate of change of speed of movement is based on an angle of inclination of the working arm relative to the body.

The center of gravity of the working machine may change as a function of the angle of inclination of the working arm. Thus, basing the maximum rate of change of speed on the angle of inclination of the working arm may inhibit instability of the working machine.

The control system may be configured such that the maximum rate of change of speed of movement decreases as the angle of inclination of the working arm increases.

The maximum rate of change of speed of movement may be inversely proportional to the angle of inclination of the working arm.

Increasing the angle of the working arm may move the center of gravity of the working machine such that the stability of the working machine is reduced. Thus, decreasing the determined maximum rate of change of speed as the determined angle of the working arm increases may inhibit instability of the working machine.

The working arm may be a telescopic working arm that is extendable and retractable. The control system may be configured to determine the center of gravity of the working machine based on a length of the working arm, and wherein the maximum rate of change of speed of movement is based on the length of the working arm.

The center of gravity of the working machine may change as a function of a length of the working arm. Thus, basing the maximum rate of change of speed on a length of the working arm may inhibit instability of the working machine.

The control system may be configured such that the maximum rate of change of speed of movement decreases as the length of the working arm increases.

Increasing the length of the working arm may move the center of gravity of the working machine such that the stability of the working machine is reduced. Thus, decreasing the maximum rate of change of speed as the length of the working arm increases may inhibit instability of the working machine.

The control system may be configured to control the drive arrangement in order to control or restrict the speed of movement of the working machine.

Advantageously, by controlling the drive arrangement, the control system may be able to rapidly and effectively control or restrict the speed of movement of the working machine.

The drive arrangement may be controlled through one or more of: a rotational speed of the drive arrangement; a torque output of the drive arrangement; and/or torque within a transmission of the drive arrangement.

The working machine may comprise a braking system actuatable to apply a braking force to the ground engaging propulsion structure. The control system may be configured to control the braking system to apply a braking force to the ground engaging propulsion structure to decelerate the speed of movement of the working machine based on the determined center of gravity.

Advantageously, by controlling the braking system based on the determined center of gravity, the control system may be able to decelerate the speed of movement of the working machine such that instability of the working machine is inhibited.

The control system may be configured to control the braking system such that the rate of deceleration is limited to a maximum rate of deceleration based on the determined center of gravity.

The rate of deceleration of the working machine may increase as the applied braking force increases. Moreover, the working machine may become more unstable as the rate of deceleration increases. As such, by limiting the rate of deceleration to a maximum rate of deceleration, instability of the working machine may be inhibited. For example, the control system may control the braking system such that the deceleration rate of the working machine is maintained within the limits of longitudinal stability at all times.

The control system may be configured to determine the center of gravity of the working machine based on an angle of inclination of the working arm, and wherein the maximum rate of deceleration is based on an angle of inclination of the working arm relative to the body.

The center of gravity of the working machine may change as a function of the angle of inclination of the working arm. Thus, basing the maximum rate of deceleration on the angle of inclination of the working arm may inhibit instability of the working machine.

The control system may be configured such that the maximum rate of deceleration decreases as the angle of inclination of the working arm increases.

The maximum rate of deceleration may be inversely proportional to the angle of inclination of the working arm.

Increasing the angle of the working arm may move the center of gravity of the working machine such that the stability of the working machine is reduced. Thus, decreasing the determined maximum rate of deceleration as the determined angle of the working arm increases may inhibit instability of the working machine.

The working arm may be a telescopic working arm that is extendable and retractable. The control system may be configured to determine the center of gravity of the working machine based on a length of the working arm, and wherein the maximum rate of deceleration is based on the length of the working arm.

The center of gravity of the working machine may change as a function of the length of the working arm. Thus, basing the maximum rate of deceleration on a length of the working arm may inhibit instability of the working machine.

The control system may be configured such that the maximum rate of deceleration decreases as the length of the working arm increases.

Increasing the length of the working arm may move the center of gravity of the working machine such that the stability of the working machine is reduced. Thus, decreasing the maximum rate of deceleration as the length of the working arm increases may inhibit instability of the working machine.

The maximum rate of change of speed of movement of the working machine and/or the maximum rate of deceleration of the working machine may be based on a speed of travel of the working machine.

Dynamic forces acting on the center of gravity of the working machine may change as a function of the determined speed of movement of the working machine. Thus, basing the rate of change of speed of movement of the working machine and/or rate of deceleration of the working machine on the speed of travel of the working machine may prevent instability of the working machine.

The control system may be configured to control or restrict a speed of movement of the working machine based on a direction of travel of the working machine.

The working machine may comprise a steering wheel and the control system is configured to control or restrict a speed of movement of the working machine based on an angular position of the steering wheel.

Dynamic forces acting on the center of gravity of the working machine may change as a function of the direction of travel of the working machine. Thus, controlling or restricting a speed of movement of the working machine based on the direction of travel of the working machine may prevent instability of the working machine.

The working machine may comprise an inclination sensor configured to determine a lateral inclination of the working machine and/or to determine a longitudinal (fore-aft) inclination. The control system may be configured to control or restrict a speed of movement of the working machine based on the determined inclination of the working machine.

The stability of the working machine may change as a function of the determined inclination of the body of the working machine. Thus, controlling or restricting a speed of movement of the working machine based on the determined inclination of the working machine may prevent instability of the working machine.

The determined center of gravity may be based on one or more of; a weight of a load carried by the working implement; a longitudinal load moment determined by the control system; or a pressure imparted to the ground engaging propulsion structure.

BRIEF DESCRIPTION OF THE DRAWINGS

Embodiments are now disclosed by way of example only with reference to the drawings, in which.

DETAILED DESCRIPTION OF EMBODIMENT(S)

Figure 1:
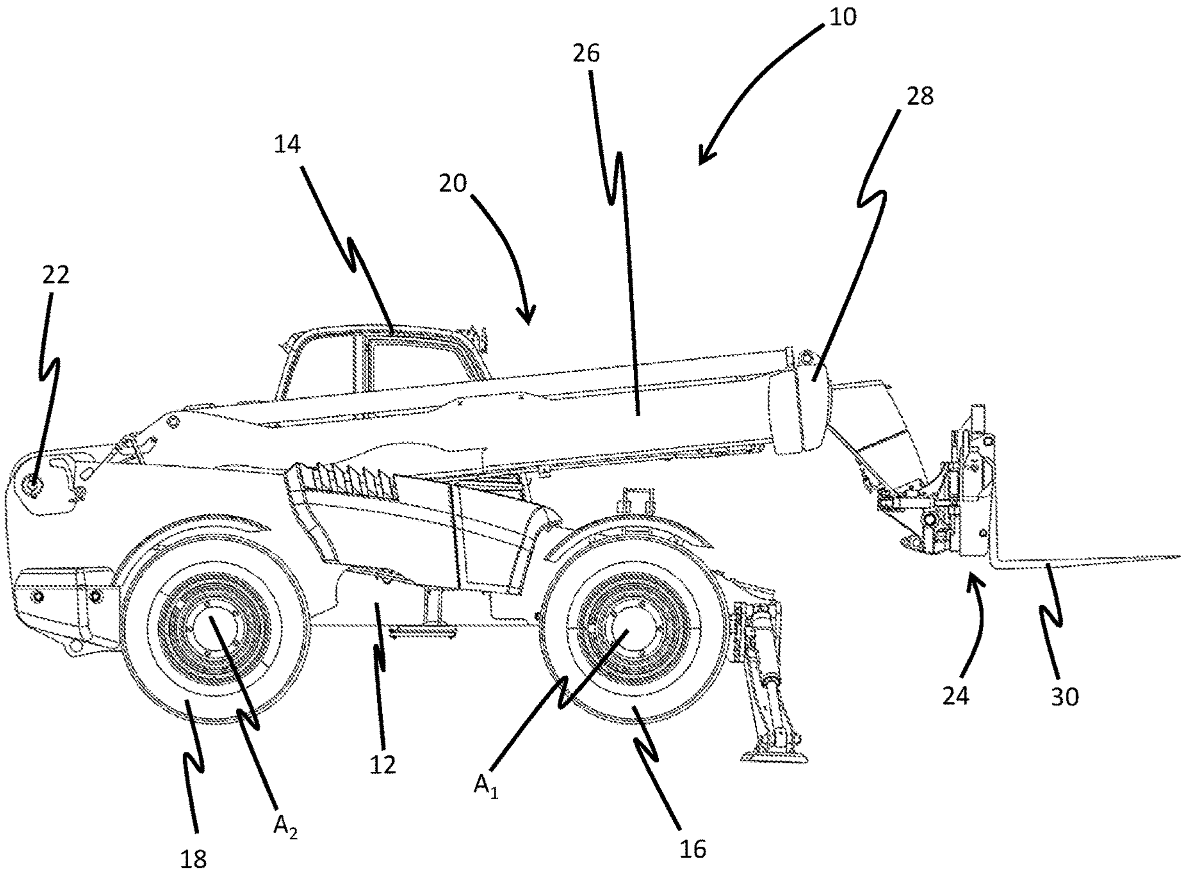
FIG. 1 is a side view of a working machine according to an embodiment.

Referring firstly to FIG. 1, an embodiment of the teachings includes a working machine 10. The working machine may be a load handling machine. In this embodiment, the working machine 10 is a telescopic handler. In other embodiments the working machine 10 may be a rotating telescopic handler, an excavator, a skid-steer loader, a compact track loader, a wheel loader, a telescopic wheel loader, or a tractor, for example. Such working machines may be denoted as off-highway vehicles or as non-road mobile machinery.

The working machine 10 includes a machine body 12. The machine body 12 may include, for example, an operator's cab 14 from which an operator can operate the machine 10. The operator cab 14 may be mounted on the body 12 so as to be offset from a center of the body. Although in alternative arrangements, the cab 14 may be substantially central. In embodiments not illustrated, the body 12 may include an undercarriage and a superstructure. The superstructure may be rotatable (e.g. about a substantially vertical axis) relative to the undercarriage. Put another way, the superstructure may be rotatable relative to the ground engaging propulsion structure. In the illustrated arrangement, the operator cab 14 is mounted onto the body 12.

The working machine 10 has a ground engaging propulsion arrangement. The ground engaging propulsion arrangement or structure supports the body 12. The ground engaging propulsion structure includes a first, or front, axle A1 and a second, or rear, axle A2, each axle being coupled to a pair of wheels 16, 18. Put another way, the ground engaging propulsion structure includes front and rear wheels. In other embodiments, the ground engaging propulsion structure may include a pair of endless tracks.

The working machine 10 includes a drive arrangement 36 configured to provide motive power to the ground engaging propulsion structure 16, 18, so as to move/drive the working machine 10 over a surface. The drive arrangement 36 includes a primer mover 38 and a transmission 40. The prime mover 38 may be an internal combustion engine, an electric motor, or may be a hybrid comprising both an internal combustion engine, an electric motor. The drive arrangement 36 is configured to provide motive power to the ground-engaging propulsion structure 16, 18 from the prime mover 38 via the transmission 40. One or both of the axles A1, A2 may be coupled to a drive arrangement (not shown) configured to provide motive power to the ground engaging propulsion structure (i.e. the axles A1, A2).

The prime mover is configured to provide motive power to the ground-engaging propulsion structure via the transmission. The transmission may include a gearbox including single gear or a plurality of gears. The working machine 10 comprises a steering wheel (not shown) located in the operator cab 14, which is configured to provide steering control of the ground-engaging propulsion structure (e.g. to steer the pair of wheels 16 and/or the pair of wheels 18.)

A working arm 20 is pivotally connected to the body 12. The working arm 20 is inclinable relative to the body 12. In the arrangement shown, the working arm 20 is pivotally mounted to the superstructure 15. The working arm 20 is connected to the body 12 by a mount 22 proximate a first end, or proximal end, of the working arm 20. The working arm 20 can be moved with respect to the body 12 and the movement is preferably, at least in part, rotational movement about the mount 22. The rotational movement is about a substantially transverse axis of the machine 10. Rotational movement of the working arm 20 with respect to the body 12 is, in an embodiment, achieved by use of at least one lifting actuator (not shown) coupled between the arm 20 and the body 12.

The working arm 20 may be a telescopic arm, having a first section 26 connected to the mount 22 and a second section 28 which is telescopically fitted to the first section 26. In this embodiment, the second section 28 of the working arm 20 is telescopically moveable with respect to the first section 26 such that the working arm 20 can be extended and retracted. Movement of the second section 28 with respect to the first section 26 of the working arm 20 may be achieved by use of an extension actuator (not shown), for example a double acting hydraulic linear actuator, an electric linear actuator, a telescopic extension ram, multiple extension rams, and/or a chain and pulley system. As will be appreciated, the working arm 20 may include a plurality of sections, for example two, three, four or more sections. Each arm section may be telescopically fitted to at least one other section, and an actuator may be provided therebetween. In alternative arrangements, the working arm 20 may not be telescopic and may include a first arm pivotally mounted to the mount 22. In such arrangements, the working arm 20 may also include a second arm pivotally mounted to the first arm.

A working implement 30 is mounted to a second, or distal, end 21 of the working arm 20. The working machine 10 is configured to transport loads carried by the working implement 30, In the illustrated arrangement, the working implement includes a carriage or carriage assembly 24 including a pair of spaced apart forks 30 mounted thereto. In alternative arrangements, it will be appreciated that any suitable working implement may be mounted to the working arm 20 to suit the application. In such alternative arrangements, the working implement may be a bucket, a shovel, or a basket, or may be any other suitable working implement.

Although not illustrated in FIG. 1, the working machine 10 includes a braking system 32 actuatable to apply a first braking force to the ground engaging propulsion structure 16, 18. It will be appreciated that the braking is configured to apply a braking force in order to decelerate the working machine 10.

Figure 2:
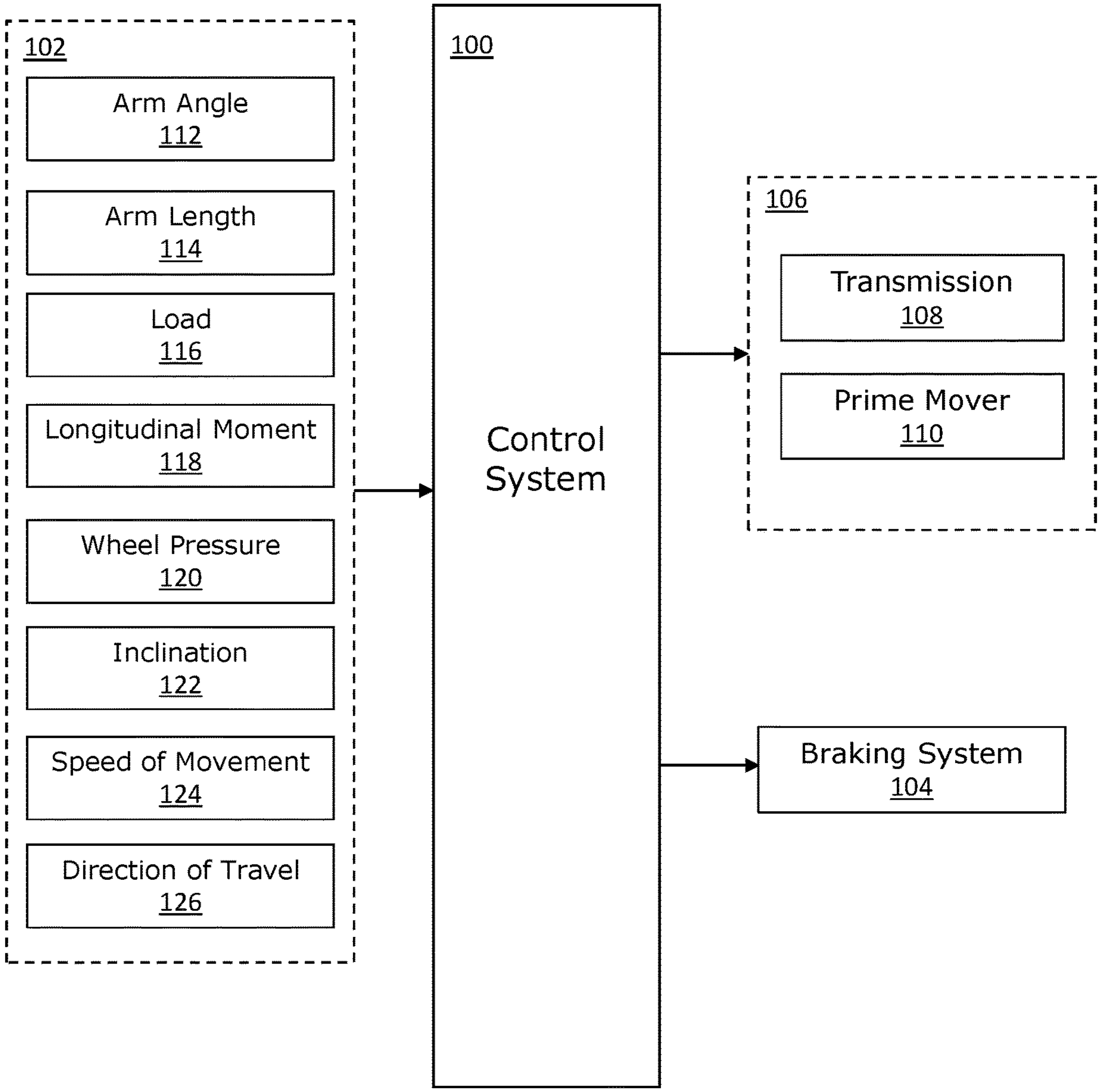
FIG. 2 is a block diagram of components of the working machine of FIG. 1.

Referring now to FIG. 2, the working machine 10 includes a control system 100, a sensor assembly 102, and a braking system 104.

The control system 100 is configured to determine a center of gravity of the working machine 10, and control or restrict a speed of movement of the working machine 10 in response to the determined center of gravity.

The control system 100 may be configured to control or restrict a speed of movement of the working machine 10 by one or more of: limiting the speed of movement of the working machine 10 to a maximum speed of movement based on the determined center of gravity; limiting the rate of change of the speed of movement of the working machine 10 to a maximum rate of change of speed of movement; and controlling the braking system to apply a braking force to the ground engaging propulsion structure to decelerate the speed of movement of the working machine based on the determined center of gravity. It will be appreciated that in alternative arrangements, any suitable arrangement for controlling or restricting the speed of movement of the working machine 10 may be used.

The working machine includes a sensor assembly 102 to monitor one or more parameters associated with the working machine 10. The control system 100 is configured to receive one or more inputs from the sensor assembly 102 and to control or restrict a speed of movement of the working machine in response to the received inputs. The control system 100 is configured to determine the center of gravity of the working machine 10 based on one or more inputs received from one or more of said sensor arrangements of the sensor assembly 102.

The control system 100 may be configured to determine the center of gravity of the working machine 10 based on an angle of inclination of the working arm 20. The sensor assembly 102 includes a first sensor 112 configured to determine an angle of inclination of the working arm 20 relative to the body 12. The first 112 is configured to determine an angle of inclination of the working arm 20 relative to the machine body 12 and to provide an output of the determined angle of inclination of the working arm 20 to the control system 100. The angle of inclination of the working arm 20 may correspond to an angle formed between the working arm 20 and a horizontal or vertical plane of the machine body 12. The first sensor 112 may determine the angle of inclination of the working arm 20 via any suitable means. For example, the first sensor 112 may determine the angle of inclination of the working arm 20 via sensing the position(s) of the at least one lifting actuator (not shown), or via sensing the angle of inclination of the working arm 20 directly, e.g. the first sensor 112 may be a potentiometer arranged at the mount 22. The control system 100 is configured to determine the center of gravity of the working machine 10 based on the angle of inclination of the working arm 20 determined by the first sensor 112.

The control system 100 may be configured to limit the speed of movement of the working machine 10 to a maximum speed of movement based on the angle of inclination of the working arm 20 relative to the body 12. The control system 100 may be configured such that the maximum speed of movement decreases as the angle of inclination of the working arm 20 increases. For example, the maximum speed of movement may be inversely proportional to the angle of inclination of the working arm 20. Increasing the angle of inclination of the working arm 20 may move the center of gravity of the working machine 10 closer to the stability envelope for the working machine 10, i.e. such that the stability of the working machine 10 is reduced. Thus, decreasing the maximum speed of movement as the determined angle of inclination of the working arm 20 increases may reduce instability of the working machine 10.

The control system 100 may be configured to limit the rate of change of the speed of movement of the working machine 10 to a maximum rate of change of speed of movement based on the angle of inclination of the working arm 20 relative to the body 12. The control system 100 may be configured such that the maximum rate of change of speed of movement decreases as the angle of inclination of the working arm 20 increases. For example, the maximum rate of change of speed of movement may be inversely proportional to the angle of inclination of the working arm 20. Increasing the angle of inclination of the working arm 20 may move the center of gravity of the working machine 10 closer to the stability envelope for the working machine 10. Thus, decreasing the maximum rate of change of speed of movement as the determined angle of inclination of the working arm 20 increases may reduce instability of the working machine 10.

The control system 100 may be configured to control/actuate the braking system to apply a braking force to the ground engaging propulsion 16, 18 structure to decelerate the speed of movement of the working machine 10 based on the angle of inclination of the working arm 20 relative to the body 12. The control system 100 may be configured such that the maximum rate of deceleration decreases as the angle of inclination of the working arm 20 increases. For example, the maximum rate of deceleration may be inversely proportional to the angle of inclination of the working arm 20. Increasing the angle of inclination of the working arm 20 may move the center of gravity of the working machine 10 closer to the stability envelope for the working machine 10. Thus, decreasing or basing the maximum rate of deceleration on the angle of inclination of the working arm 20 may reduce instability of the working machine 10.

The sensor assembly 102 includes a second sensor 114 configured to determine a length of the telescopic arm 20. Put another way, the second sensor 114 is configured to determine the amount of extension or retraction of the telescopic working arm 20. It will be appreciated that in arrangements when the working arm 20 is not telescopic, the second sensor 114 may be omitted.

The second sensor 114 is configured to determine a length of the working arm 20 and to provide an output of the determined length of the working arm 20 to the control system 100. By 'length of the working arm 20', it is intended to mean the distance between the first, or proximal, end of the arm 20 proximate the mount 22 and the second, or distal, end of the arm 20. The length sensor arrangement 114 may determine the length of the working arm 20 via any suitable means. For example, the length sensor arrangement 114 may determine the length of the working arm 20 via sensing the position(s) of the extension actuator (not shown).

The control system 100 is configured to determine the center of gravity of the working machine 10 based on the length of the working arm 20 determined by the length sensor arrangement 114.

The control system 100 may be configured to limit the speed of movement of the working machine 10 to a maximum speed of movement based on the determined length of the working arm 20. The control system 100 may be configured such that the maximum speed of movement decreases as the length of the working arm 20 increases. For example, the maximum speed of movement may be inversely proportional to the length of the working arm 20.

The control system 100 may be configured to limit the rate of change of the speed of movement of the working machine 10 to a maximum rate of change of speed of movement based on the determined length of the working arm 20. The control system 100 may be configured such that the maximum rate of change of speed of movement decreases as the as the length of the working arm 20 increases. For example, the maximum rate of change of speed of movement may be inversely proportional to the length of the working arm 20.

The control system 100 may be configured to control/actuate the braking system to apply a braking force to the ground engaging propulsion 16, 18 structure to decelerate the speed of movement of the working machine 10 based on the determined length of the working arm 20. The control system 100 may be configured such that the maximum rate of deceleration decreases as the length of the working arm 20 increases.

The control system 100 may be configured to determine the center of gravity of the working machine 10 based on a weight of a load carried by the working implement 30 determined by the load sensor arrangement 116. Put another way, the control system 100 may be configured to control or restrict a speed of movement of the working machine 10 based on a weight of a load carried by the working implement 30. In such arrangements, the sensor assembly 102 may include a third sensor 116 configured to determine a weight of a load carried by the working implement 30 and to provide an output of the determined weight of the load carried by the working implement 30 to the control system 100. The third sensor 116 may determine a weight of a load carried by the working implement 30 via any suitable means. For example, when the at least one lifting actuator (not shown) is a hydraulic linear actuator, the third sensor 116 may determine a weight of a load carried by the working implement 30 via sensing a hydraulic pressure of the at least one lifting actuator. Additionally or alternatively, the third sensor 116 may determine a weight of a load carried by the working implement 30 via sensing the stresses or strains acting on the working arm 20, e.g. the third sensor 116 may include a strain gauge.

It will be appreciated that in such arrangements, the control system 100 may be configured to: limit the speed of movement of the working machine 10 to a maximum speed of movement based on a weight of a load carried by the working implement 30; limit the rate of change of the speed of movement of the working machine 10 to a maximum rate of change of speed of movement based on a weight carried by the working implement 30; and/or control the braking system to apply a braking force to the ground engaging propulsion structure to decelerate the speed of movement of the working machine based on a weight of a load carried by the working implement 30.

The control system 100 may be configured to determine the center of gravity of the working machine 10 based on a longitudinal load moment indication. Put another way, the control system 100 may be configured to control or restrict a speed of movement of the working machine 10 based on a longitudinal load moment indication. In such arrangements, the sensor assembly 102 includes a fourth sensor 118 configured to determine a longitudinal load moment of the working machine 10 and to provide an output of the determined longitudinal load moment to the control system 100. By 'longitudinal load moment', it is intended to mean the resultant moment acting on the working machine 100 about an axis parallel to the first and second axles A1, A2 (i.e. a transverse axis of the working machine 100) that intersects the center of gravity of the working machine 100. The longitudinal load moment is defined as positive in the clockwise direction in FIG. 1. The fourth sensor 118 may determine the longitudinal load moment of the working machine 10 via any suitable means. For example, the fourth sensor 118 may determine the longitudinal load moment of the working machine 10 via sensing the load imparted by the working machine 10 on the rear axle A2. The fourth sensor 118 may be, include, or form part of, a longitudinal load moment indicator (LLMI).

It will be appreciated that in such arrangements, the control system 100 may be configured to: limit the speed of movement of the working machine 10 to a maximum speed of movement based on a longitudinal load moment indication; limit the rate of change of the speed of movement of the working machine 10 to a maximum rate of change of speed of movement based on a longitudinal load moment indication; and/or control the braking system to apply a braking force to the ground engaging propulsion structure to decelerate the speed of movement of the working machine based on a longitudinal load moment indication.

The control system 100 may be configured to determine the center of gravity of the working machine 10 based on a pressure imparted onto the ground engaging propulsion structure 16, 18 (e.g. on opposing sides of the working machine 10 and/or at the front and rear of the working machine 10). Put another way, the control system 100 may be configured to control or restrict a speed of movement of the working machine 10 based on a pressure imparted onto the ground engaging propulsion structure 16, 18 (e.g. on opposing sides of the working machine 10). The pressure imparted onto the ground engaging structure may be a wheel or tire pressure. In such arrangements, the sensor assembly 102 may include a fifth sensor 120 configured to determine a pressure imparted onto the ground engaging propulsion structure. It will be appreciated that the fifth sensor 120 may be formed from a plurality of sensors to determine the pressure imparted on different parts (e.g. on opposing sides of the working machine 10) of the ground engaging propulsion structure 16, 18.

The control system 100 may be configured to control the drive arrangement 106 in order to control or restrict the speed of movement of the working machine 10. For example, the control system 100 may be configured to control the drive arrangement 106 in order to limit the speed of movement of the working machine 10 to a maximum speed of movement, and/or to limit the rate of change of speed of movement of the working machine 10 to a maximum rate of change of speed of movement.

In such arrangements, the control system 100 may control or restrict the speed of movement of the working machine 10 and/or the rate of change of s speed of movement of the working machine 10 by controlling a rotational speed of the drive arrangement 106. The control system 100 may be configured to limit the speed of movement of the working machine 10 to a maximum speed of movement by limiting a rotational speed of the drive arrangement 106, by limiting a torque output of the drive arrangement and/or by limiting a torque with the transmission 108.

The control system 100 may control a rotational speed of the drive arrangement 106 in order to control or restrict the speed of movement of the working machine 10. In embodiments in which the prime mover 110 is an internal combustion engine, the rotational speed of the drive arrangement 114 may correspond to a rotational speed of the engine's crankshaft. In embodiments in which the prime mover 110 is an electric motor, the rotational speed of the drive arrangement 114 may correspond to a rotational speed of the rotor and/or output shaft of the motor. The control system 100 may send a signal (e.g. a TSC1 signal) to a controller of the prime mover 110 to control the rotational speed of the prime mover 110. Alternatively, the rotational speed of the drive arrangement 106 may correspond to a rotational speed of the transmission 108. For example, the rotational speed of an output shaft from a gearbox of the transmission 108. The control system 100 may send a signal to a controller of the transmission 108 to control the rotational speed of the transmission (e.g. to change a gear ratio in the gear box).

The control system 100 may control a torque output of the drive arrangement 106 in order to control or restrict the speed of movement of the working machine 10. In embodiments in which the prime mover 110 is an internal combustion engine, the torque output of the drive arrangement 106 may correspond to a torque of the engine's crankshaft. In embodiments in which the prime mover 110 is an electric motor, the torque output of the drive arrangement 106 may correspond to a torque of the rotor and/or output shaft of the motor. The control system 100 may send a signal to a controller of the prime mover 110 to control the torque output of the prime mover 110. Alternatively, the torque output of the drive arrangement 106 may correspond to a torque output of the transmission 108. For example, the torque of an output shaft from a gearbox of the transmission 108. The control system 100 may send a signal to a controller of the transmission 108 to control the torque output of the transmission (e.g. to change a gear ratio in the gear box).

The control system 100 may control a torque within the transmission 108 of the drive arrangement 106 to control or restrict the speed of movement of the working machine 10. The torque within the transmission 108 may correspond to the torque of a gear shaft in a gearbox of the transmission. The control system 100 may send a signal to a controller of the transmission 108 to control the torque within the transmission (e.g. to change a gear ratio in the gear box).

The control system 100 may be configured to control or restrict the speed of movement of the working machine 10 based on the lateral inclination angle and/or longitudinal inclination angle (hereinafter 'inclination') of the working machine 10. In such arrangements, the sensor assembly 102 may include a sixth sensor 122 configured to determine a lateral inclination angle of the working machine 10 and/or to determine a longitudinal (i.e. fore-aft) inclination angle of the working machine 10 and to provide an output of the determined lateral and/or longitudinal inclination angle(s) of the working machine 10 to the control system 100. By 'lateral inclination angle', it is intended to mean the angle formed between a transverse axis of the machine body 12 and the horizontal. By 'longitudinal inclination angle', it is intended to mean the angle formed between a fore-aft axis of the machine body 12 and the horizontal. The inclination sensor 122 may determine the lateral and/or longitudinal inclination angle(s) of the working machine 10 via any suitable means.

The control system 100 may be configured such that the maximum speed of movement of the working machine 10 previously discussed is based on the determined inclination of the working machine 10. The maximum speed of movement may decrease as the inclination of the working machine 10 increases. Additionally or alternatively, the control system 100 may be configured such that the maximum rate of change of speed of movement of the working machine 10 previously discussed is based on the determined inclination of the working machine 10. The maximum rate of change of speed of movement may decrease as the inclination of the working machine 10 increases. Additionally or alternatively, the control system 100 may be configured such that the maximum rate of deceleration of the working machine 10 previously discussed is based on the determined inclination of the working machine 10. The maximum rate of deceleration may decrease as the inclination of the working machine 10 increases.

The control system 100 may be configured to control or restrict a speed of movement of the working machine 10 based on the speed of travel of the working machine 10. In such arrangements, the sensor assembly 102 may include a seventh sensor 124 configured to determine a speed of travel of the working machine 10 and to provide an output of the determined speed of travel of the working machine 10 to the control system 100. The speed sensor arrangement 124 may determine the speed of travel of the working machine 10 via any suitable means such as determining the rotational speed of the ground engaging propulsion structure 16, 18 or the axles A1, A2, via sensing a rotational speed of the transmission 110, or via GPS.

The control system 100 may be configured to control the maximum rate of change of speed of movement of the working machine 10 be based on the determined speed of travel of the working machine 10. For example, as the determined speed of travel increases, the maximum rate of change of speed of movement may be reduced. Additionally or alternatively, the control system 100 may be configured to control the maximum rate of deceleration based on the determined speed of travel of the working machine 10. For example, as the determined speed of travel increases, the maximum rate of deceleration may be reduced. Advantageously, this may help to inhibit longitudinal instability of the working machine 10 (e.g. longitudinal tip over).

The control system 100 may be configured to control or restrict a speed of movement of the working machine 10 based on the direction of travel of the working machine 10. In such arrangements, the sensor assembly 102 may include an eight sensor 126 configured to determine a direction of travel of the working machine 10 and to provide an output of the determined direction of travel of the working machine 10 to the control system 100. By 'direction of travel', it is intended to mean the direction the working machine 10 is moving relative to the ground beneath the working machine 10. The direction of travel may correspond to whether the working machine 10 is travelling forwards, i.e. to the right in FIG. 1, or in reverse, i.e. to the left in FIG. 1. Additionally or alternatively, the direction of travel may correspond to whether the working machine is turning left or right. The direction sensor arrangement 126 may determine the direction of travel of the working machine 10 via any suitable means. For example, the direction sensor arrangement 126 may determine the direction of travel of the working machine 10 via sensing whether a forward or reverse gear has been selected in a gearbox of the transmission 108, via sensing an angular position of the steering wheel (not shown), and/or via GPS. Based on the center of gravity of the working machine 10, the working machine 10 may be more stable travelling in a first direction, e.g. forwards, relative to a second direction, e.g. reverse. Thus, controlling or restricting the speed of movement of the working machine 10 based on the determined direction of travel of the working machine 10 may reduce instability of the working machine 10.

The control system 100 may be configured such that the maximum speed of movement of the working machine 10 is based on the determined direction of travel of the working machine 10. Additionally or alternatively, the control system 100 may be configured such that the maximum rate of change of speed of movement of the working machine 10 is based on the determined direction of travel of the working machine 10. Additionally or alternatively, the control system 100 may be configured such that the maximum rate of deceleration of the working machine 10 is based on the determined direction of travel of the working machine 10.

In embodiments in which the eighth sensor 126 senses an angular position of the steering wheel (not shown), the maximum speed of movement may decrease as the angular position of the steering wheel increases. Additionally or alternatively, the maximum rate of change of speed of movement of the working machine 10 may decrease as the angular position of the steering wheel increases. Additionally or alternatively, the maximum rate of deceleration of the working machine 10 may decrease as the angular position of the steering wheel increases.

It will be appreciated that in alternative embodiments, the sensor assembly 102 may not include all of the first to eight sensors (i.e. angle sensor 112, length sensor 114, load sensor 116, moment sensor 118, pressure sensor 120, inclination sensor 122, speed sensor 124, and the direction sensor 126), and instead only include a single sensor or may include any combination thereof. Moreover, in further alternative embodiments, the control system 100 may only control one of the drive arrangement 106 and the braking system 104.

The invention claimed is:

1. A working machine comprising:
- a body;
- a ground-engaging propulsion structure supporting the body;
- a working arm pivotally connected to the body so as to be inclinable relative to the body, wherein the working arm is configured to mount a working implement at a distal end thereof;
- a drive arrangement configured to provide motive power to the ground-engaging propulsion structure; and
- a control system configured to determine a center of gravity of the working machine,
- wherein the control system is configured to control or restrict a speed of movement of the working machine in response to the determined center of gravity, and
- wherein the control system is configured to limit the speed of movement of the working machine to a maximum speed of movement based on the determined center of gravity.

2. The working machine of claim 1, wherein the control system is configured to determine the center of gravity of the working machine based on an angle of inclination of the working arm, and wherein the maximum speed of movement is based on an angle of inclination of the working arm relative to the body.

3. The working machine of claim 2, wherein the control system is configured such that the maximum speed of movement decreases as the angle of inclination of the working arm increases; optionally, wherein the maximum speed of movement is inversely proportional to the angle of inclination of the working arm.

4. The working machine of claim 1, wherein the working arm is a telescopic working arm that is extendable and retractable, wherein the control system is configured to determine the center of gravity of the working machine based on a length of the working arm, and wherein the maximum speed of movement is based on the length of the working arm.

5. The working machine of claim 4, wherein the control system is configured such that the maximum speed of movement decreases as the length of the working arm increases.

6. The working machine of claim 1, wherein the control system is configured to limit the rate of change of the speed of movement to a maximum rate of change of speed of movement based on the determined center of gravity.

7. The working machine of claim 6, wherein the control system is configured to determine the center of gravity of the working machine based on an angle of inclination of the working arm, and wherein the maximum rate of change of speed of movement is based on an angle of inclination of the working arm relative to the body.

8. The working machine of claim 7, wherein the control system is configured such that the maximum rate of change of speed of movement decreases as the angle of inclination of the working arm increases; optionally, wherein the maximum rate of change of speed of movement is inversely proportional to the angle of inclination of the working arm.

9. The working machine of claim 6, wherein the working arm is a telescopic working arm that is extendable and retractable, wherein the control system is configured to determine the center of gravity of the working machine based on a length of the working arm, and wherein the maximum rate of change of speed of movement is based on the length of the working arm.

10. The working machine of claim 9, wherein the control system is configured such that the maximum rate of change of speed of movement decreases as the length of the working arm increases.

11. The working machine of claim 6, wherein the maximum rate of change of speed of movement of the working machine and/or the maximum rate of deceleration of the working machine is based on a speed of travel of the working machine.

12. The working machine of claim 1, comprising a braking system actuatable to apply a braking force to the ground engaging propulsion structure, wherein the control system is configured to control the braking system to apply a braking force to the ground engaging propulsion structure to decelerate the speed of movement of the working machine based on the determined center of gravity.

13. The working machine of claim 12, wherein the control system is configured to control the braking system such that the rate of deceleration is limited to a maximum rate of deceleration based on the determined center of gravity.

14. The working machine of claim 13, wherein the control system is configured to determine the center of gravity of the working machine based on an angle of inclination of the working arm, and wherein the maximum rate of deceleration is based on an angle of inclination of the working arm relative to the body.

15. The working machine of claim 14, wherein the control system is configured such that the maximum rate of deceleration decreases as the angle of inclination of the working arm increases; optionally, wherein the maximum rate of deceleration is inversely proportional to the angle of inclination of the working arm.

16. The working machine of claim 13, wherein the working arm is a telescopic working arm that is extendable and retractable, wherein the control system is configured to determine the center of gravity of the working machine based on a length of the working arm, and wherein the maximum rate of deceleration is based on the length of the working arm.

17. The working machine of claim 14, wherein the control system is configured such that the maximum rate of deceleration decreases as the length of the working arm increases.

18. The working machine of claim 1, wherein the determined center of gravity is based on one or more of; a weight of a load carried by the working implement; a longitudinal load moment determined by the control system; or a pressure imparted to the ground engaging propulsion structure.

19. A working machine comprising:

a body;

a ground-engaging propulsion structure supporting the body;

a working arm pivotally connected to the body so as to be inclinable relative to the body, wherein the working arm is configured to mount a working implement at a distal end thereof;

a drive arrangement configured to provide motive power to the ground-engaging propulsion structure; and a control system configured to determine a center of gravity of the working machine, wherein the control system is configured to control or restrict a speed of movement of the working machine in response to the determined center of gravity, and wherein the control system is configured to limit the rate of change of the speed of movement to a maximum rate of change of speed of movement based on the determined center of gravity.

20. A working machine comprising:

a body;

a ground-engaging propulsion structure supporting the body;

a braking system actuatable to apply a braking force to the ground-engaging propulsion structure a working arm pivotally connected to the body so as to be inclinable relative to the body, wherein the working arm is configured to mount a working implement at a distal end thereof;

a drive arrangement configured to provide motive power to the ground-engaging propulsion structure; and a control system configured to determine a center of gravity of the working machine, wherein the control system is configured to control or restrict a speed of movement of the working machine in response to the determined center of gravity, and wherein the control system is configured to control the braking system to apply a braking force to the ground-engaging propulsion structure to decelerate the speed of movement of the working machine based on the determined center of gravity.

* * * * *